(12) United States Patent
Chen et al.

(10) Patent No.: US 8,274,593 B2
(45) Date of Patent: Sep. 25, 2012

(54) OPTICAL LENS SYSTEM

(75) Inventors: Chun-Shan Chen, Taichung (TW);
Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 132 days.

(21) Appl. No.: 12/987,113

(22) Filed: Jan. 8, 2011

(65) Prior Publication Data

US 2012/0176527 A1 Jul. 12, 2012

(51) Int. Cl.
*H04N 5/225* (2006.01)
*G02B 9/58* (2006.01)
(52) U.S. Cl. ........................................ 348/335; 359/782
(58) Field of Classification Search .................. 348/340, 348/335; 250/208.1; 359/782, 715
See application file for complete search history.

(56) References Cited

U.S. PATENT DOCUMENTS 7,548,385 B2 * 6/2009 Hirano ........................... 359/782
7,692,877 B2 * 4/2010 Tang et al. .................... 359/773

* cited by examiner

*Primary Examiner* — Chieh M Fan
*Assistant Examiner* — Akshay Trehan (57) ABSTRACT

An optical lens system comprises, in order from an object side to an image side: the first lens element with negative refractive power having a convex object-side surface and a concave image-side surface; the second lens element with positive refractive power; the third lens element with positive refractive power having the object-side surface and the image-side surface being aspheric; the fourth lens element with negative refractive power having a concave image-side surface and at least one aspheric surface. There are four lens elements with refractive power. Such arrangements can enable a larger field of view, reduce the volume of the system, and further obtain higher resolution for the optical lens system of the present invention.

21 Claims, 7 Drawing Sheets

OPTICAL LENS SYSTEM

BACKGROUND OF THE INVENTION

1. Field of the Invention

The present invention relates to an optical lens system, and more particularly to a miniaturized optical lens system used in electronic products.

2. Description of the Prior Art

In recent years, with the popularity of the portable electronic products with video recording function, the optical lens system has become smaller and smaller, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Conventional miniaturized lens systems used in portable electronic products mostly consist of three lens elements, from an object side to an image side: the first lens element with positive refractive power, the second lens element with negative refractive power and the third lens element with positive refractive power.

Due to advances in semiconductor manufacturing and the trend of miniaturization of electronic products, the pixel size of electronic imaging sensors gradually becomes smaller and smaller, which makes the system require an optical lens system providing higher image quality. The conventional optical lens system comprising three lens elements cannot satisfy the requirements of higher resolution optical lens systems.

Another type of conventional optical system is a four-piece lens assembly for example, in which the first lens element and the second lens element are both glass spherical lens elements and bonded to each other to form a doublet lens element for eliminating chromatic aberration. However, it suffers from the following disadvantages: the degree of freedom available in the optical system is limited since there are too many glass spherical lens elements; and the manufacturing difficulty is increased due to the difficult process of bonding between the glass lens elements.

The present invention can effectively mitigate the aforementioned disadvantages.

SUMMARY OF THE INVENTION

The primary objective of the present invention is to provide an optical lens system comprising four lens element, which is capable of providing a larger field of view and higher resolution while effectively reducing the volume of the optical lens system.

An optical lens system in accordance with the present invention comprises, in order from an object side to an image side: the first lens element with negative refractive power having a convex object-side surface and a concave image-side surface; the second lens element with positive refractive power; the third lens element with positive refractive power, the object-side and the image-side surfaces of the third lens element being aspheric; and the fourth lens element with negative refractive power having a concave image-side surface, the object-side and the image-side surfaces of the fourth lens element being aspheric. In the optical lens system, there are four lens elements with refractive power. The distance on an optical axis between the first lens element and the second lens element is T12, the focal length of the optical lens system is f, and the center thickness of the first lens element is CT1. The optical lens system is further provided with an aperture stop, the distance from the aperture stop to an image plane along the optical axis is SL, the distance from the object-side surface of the first lens element to the image plane along the optical axis is TTL, and they satisfy the relations:

$$0.1 < T12/f < 0.3;$$

$$0.30 < CT1/f < 0.75;$$

$$0.52 < SL/TTL < 0.82.$$

When $0.1 < T12/f < 0.3$ is satisfied, it will be favorable for correcting the high order aberrations of the system, and the lens system can be more balanced. Also, it will be favorable to reduce the total track length of the optical lens system, so as to maintain the objective of miniaturization of the optical lens system. When T12/f satisfies the relation: $0.07 < T12/f < 0.50$, the total track length of the optical lens system can be reduced and the image quality can be improved. When $0.30 < CT1/f < 0.75$ is satisfied, the thickness of the first lens element is suitable, which reduces manufacturing difficulties while increasing manufacturing yield. When $0.52 < SL/TTL < 0.82$ is satisfied, the wide field of view is emphasized, it will be favorable to correct the distortion and the chromatic aberration of magnification, and the optical system is less sensitive as well.

In the present optical lens system, the first lens element with negative refractive power has a convex object-side surface and a concave image-side surface, it will be favorable to enlarge the field of view of the optical lens system.

The second lens element with positive refractive power provides partial refractive power of the optical lens system, it will be favorable to reduce the total track length of the optical lens system.

The third lens element with positive refractive power can effectively distribute the positive refractive power of the second lens element in such a manner that the sensitivity of the optical lens system will be reduced. In the present optical lens system, if the object-side and the image-side surfaces of the third lens element are convex, it will be favorable to increase the positive refractive power of the third lens element, and the total track length of the optical lens system will become much shorter.

The fourth lens element with negative refractive power has a concave image-side surface, so that the principal point of the system will be far away from the image plane, and it will be favorable to reduce the total track length of the optical lens system, so as to maintain the objective of miniaturization of the optical lens system. In addition, the inflection points can be formed on the fourth lens element, which can better correct the incident angle of the off axis light with respect to the sensor and further correct the off-axis aberration of the system.

According to one aspect of the present optical lens system, the focal length of the second lens element is f2, and the focal length of the third lens element is f3. When f3/f2 satisfies the relation: $0.2 < f3/f2 < 0.7$, the third lens element can effectively distribute the refractive power of the optical lens system so as to prevent the refractive power of individual lens elements from becoming too large, and thus reducing the sensitivity of the optical lens system.

According to another aspect of the present optical lens system, an air distance exists between the first lens element and the second lens element, the center thickness of the first lens element is CT1, and the center thickness of the second lens element is CT2. When CT2/CT1 satisfies the relation:

0.2<CT2/CT1<0.50, the thickness of the first lens element and the second lens element will not be too large or too small, it will be favorable to assemble the lens elements.

According to another aspect of the present optical lens system, the focal length of the first lens element is f1, and the focal length of the fourth lens element is f4. When f4/f1 satisfies the relation: 0.2<f4/f1<0.6, the refractive power of the first lens element and the fourth lens element are more balanced, it will be favorable for correcting the high order aberrations of the system. In addition, when f4/f1 satisfies the relation: 0.2<f4/f1<0.45, the high order aberrations of the system will be corrected even better.

Figure 1A:
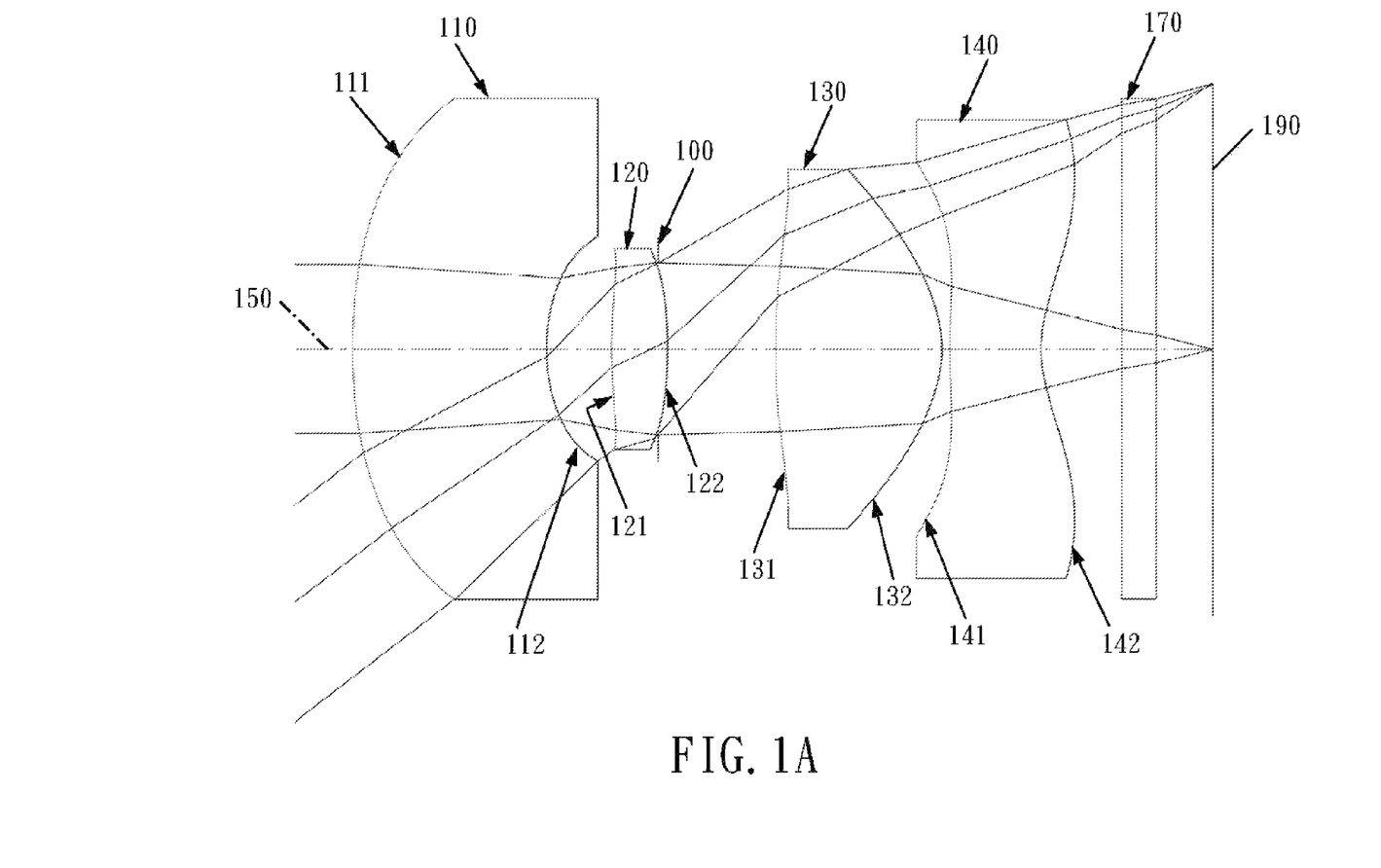
FIG. 1A shows an optical lens system in accordance with a first embodiment of the present invention.
Figure 1B:
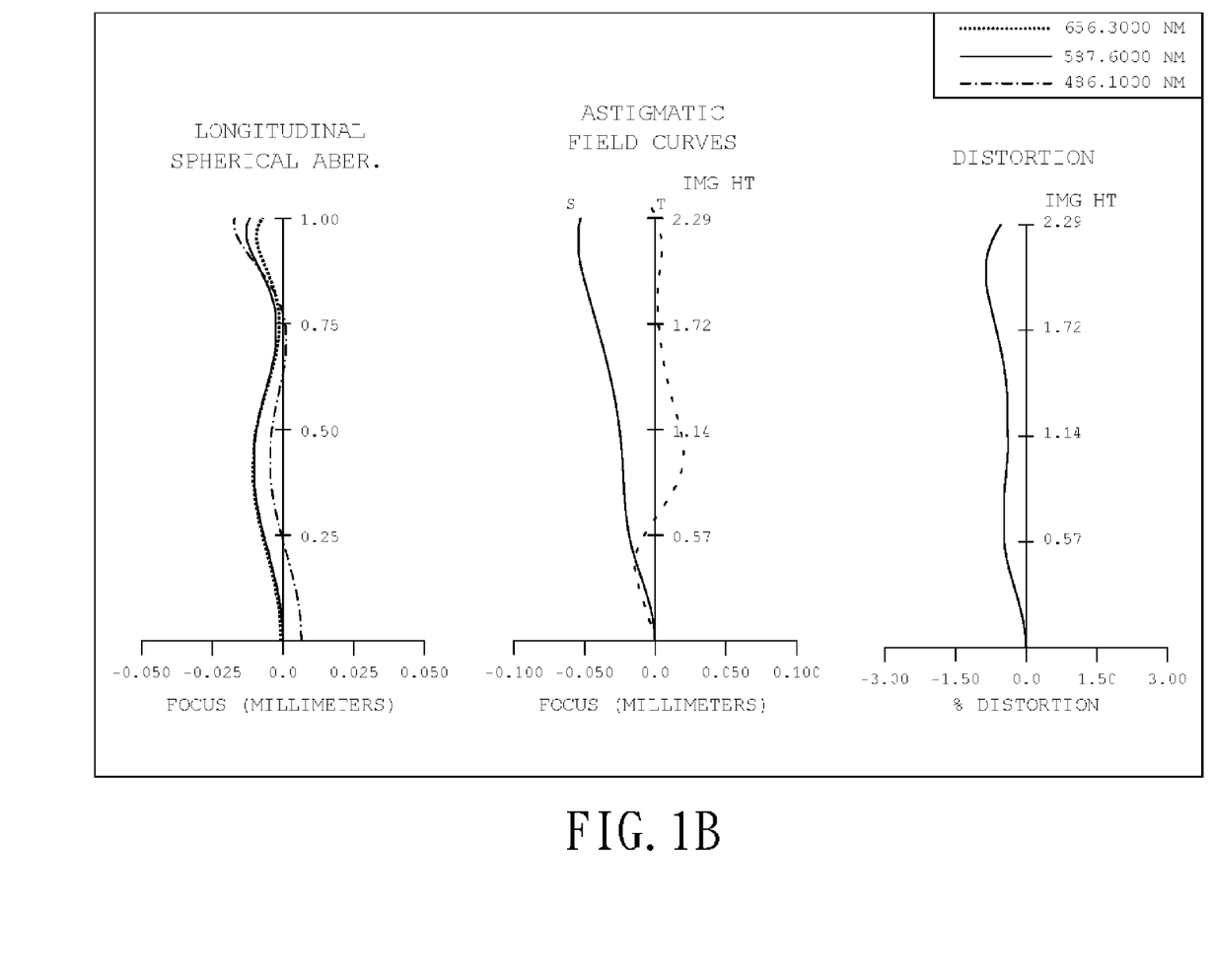
FIG. 1B shows the aberration curves of the first embodiment of the present invention.
Figure 1C:
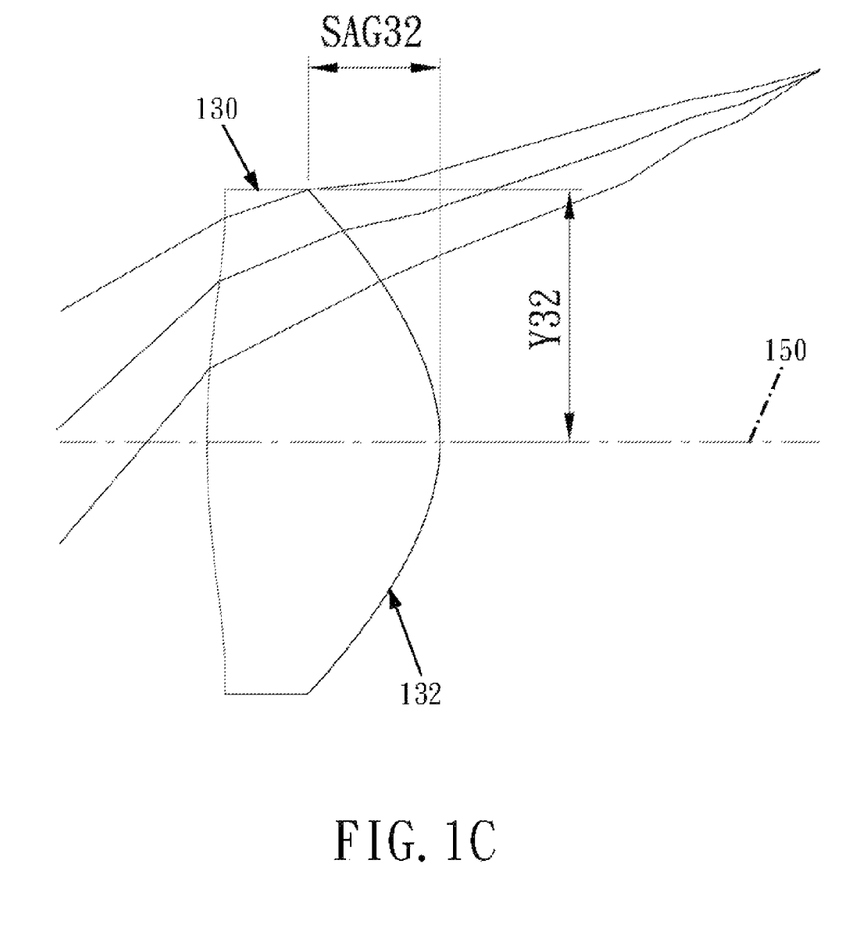
FIG. 1C shows SAG32 and Y32 of the first embodiment of the present invention.

According to another aspect of the present optical lens system, FIG. 1C is an illustrative view showing SAG32 and Y32. The vertical distance from the furthest position of the light passing through the image-side surface of the third lens element to the optical axis is Y32, the distance between the position Y32 from the optical axis on the image-side surface of the third lens element and a vertex on the image-side surface of the third lens element on the optical axis is SAG32. When SAG32/Y32 satisfies the relation: 0.4<SAG32/Y32<0.6, the shape of the third lens element will not be too curvy, it will be favorable to the manufacturing of the lens elements. Also, it will be favorable to reduce the space required to assemble the lens elements of the system, making the optical lens system more compact.

According to another aspect of the present optical lens system, the Abbe number of the third lens element is V3, and the Abbe number of the fourth lens element is V4. When V3−V4 satisfies the relation: 30<V3−V4<42, it will be favorable to correct the chromatic aberration caused by the optical lens system.

According to another aspect of the present optical lens system, the radius of curvature of the object-side surface of the first lens element is R1, and the radius of curvature of the image-side surface of the first lens element is R2. When R1/R2 satisfies the relation: 2.0<R1/R2<3.0, it will be favorable to correct the spherical aberration caused by the system.

According to another aspect of the present optical lens system, the distance from the object-side surface of the first lens element to the image plane along the optical axis is TTL, wherein an electronic imaging sensor is provided on the image plane and half of a diagonal length of an effective pixel region of the electronic imaging sensor is ImgH. When TTL/ImgH satisfies the relation: TTL/ImgH<3.8, it will be favorable to maintain the objective of miniaturization of the optical lens system, enabling the lens system to be used in the portable electronic products.

The present invention will be further explained in details from the following description in connection with the accompanying drawings, which show, for purpose of illustrations only, the preferred embodiments in accordance with the present invention.

DETAILED DESCRIPTION OF THE PREFERRED EMBODIMENTS

Referring to FIG. 1A, which shows an optical lens system in accordance with the first embodiment of the present invention, and FIG. 1B shows the aberration curves of the first embodiment of the present invention. An optical lens system in accordance with the first embodiment of the present invention comprises, in order from an object side to an image side:

A plastic first lens element 110 with negative refractive power has a convex object-side surface 111 and a concave image-side surface 112, and the object-side surface 111 and the image-side surface 112 of the first lens element 110 are aspheric.

A plastic second lens element 120 with positive refractive power has a convex object-side surface 121 and a convex image-side surface 122, and the object-side surface 121 and the image-side surface 122 of the second lens element 120 are aspheric.

A plastic third lens element 130 with positive refractive power has a convex object-side surface 131 and a convex image-side surface 132, and the object-side surface 131 and the image-side surface 132 of the third lens element 130 are aspheric.

A plastic fourth lens element 140 with negative refractive power has a convex object-side surface 141 and a concave image-side surface 142, the object-side surface 141 and the image-side surface 142 of the fourth lens element 140 are aspheric, and inflection points are formed on the object-side surface 141 and the image-side surface 142 of the fourth lens element 140.

An aperture stop 100 is located between the second lens element 120 and the third lens element 130.

An IR cut filter 170 made of glass is located between the image-side surface 142 of the fourth lens element 140 and an image plane 190, and it has no influence on the focal length of the optical lens system.

The equation for the aspheric surface profiles of the first embodiment is expressed as follows:

$$X(Y) = (Y^2/R) \Big/ \left(1 + (1 - (1+k)*(Y/R)^2)^{1/2}\right) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis, k: the conic coefficient;

Ai: the aspheric surface coefficient of order i.

In the first embodiment of the present optical lens system, the focal length of the optical lens system is f, and it satisfies the relation:

$f=3.02$.

In the first embodiment of the present optical lens system, the f-number of the optical lens system is Fno, and it satisfies the relation:

$Fno=2.05$.

In the first embodiment of the present optical lens system, half of the maximal field of view is HFOV, and it satisfies the relation:

$$HFOV=37.4.$$

In the first embodiment of the present optical lens system, the Abbe number of the third lens element 130 is V3, the Abbe number of the fourth lens element 140 is V4, and they satisfy the relation:

$$V3-V4=32.5.$$

In the first embodiment of the present optical lens system, the distance on the optical axis between the first lens element 110 and the second lens element 120 is T12, the focal length of the optical lens system is f, and they satisfy the relation:

$$T12/f=0.19.$$

In the first embodiment of the present optical lens system, the center thickness of the first lens element 110 is CT1, the focal length of the optical lens system is f, and they satisfy the relation:

$$CT1/f=0.56.$$

In the first embodiment of the present optical lens system, the center thickness of the first lens element 110 is CT1, the center thickness of the second lens element 120 is CT2, and they satisfy the relation:

$$CT2/CT1=0.29.$$

In the first embodiment of the present optical lens system, the radius of curvature of the object-side surface 111 of the first lens element 110 is R1, the radius of curvature of the image-side surface 112 of the first lens element 110 is R2, and they satisfy the relation:

$$R1/R2=2.55.$$

In the first embodiment of the present optical lens system, the focal length of the second lens element 120 is f2, the focal length of the third lens element 130 is f3, and they satisfy the relation:

$$f3/f2=0.43.$$

In the first embodiment of the present optical lens system, the focal length of the first lens element 110 is f1, the focal length of the fourth lens element 140 is f4, and they satisfy the relation:

$$f4/f1=0.38.$$

In the first embodiment of the present optical lens system, the vertical distance from the furthest position of the light passing through the image-side surface 132 of the third lens element 130 to the optical axis 150 is Y32, the distance between the position Y32 from the optical axis 150 on the image-side surface 132 of the third lens element 130 and a vertex on the image-side surface 132 of the third lens element 130 on the optical axis 150 is SAG32, as shown in FIG. 1C, and they satisfy the relation:

$$SAG32/Y32=0.52.$$

In the first embodiment of the present optical lens system, the distance from the aperture stop 100 to the image plane 190 along the optical axis 150 is SL, the distance from the object-side surface 111 of the first lens element 110 to the image plane 190 along the optical axis 150 is TTL, and they satisfy the relation:

$$SL/TTL=0.64.$$

In the first embodiment of the present optical lens system, the distance from the object-side surface 111 of the first lens element 110 to the image plane 190 along the optical axis 150 is TTL, an electronic imaging sensor (not shown) is provided on the image plane 190, half of a diagonal length of an effective pixel region of the electronic imaging sensor is ImgH, and they satisfy the relation:

$$TTL/ImgH=3.21.$$

The detailed optical data of the first embodiment is shown in table 1, and the aspheric surface data is shown in table 2, wherein the units of the radius of curvature, the thickness and the focal length are expressed in mm.

TABLE 1

(Embodiment 1)
f(focal length) = 3.02 mm, Fno = 2.05, HFOV (half of field of view) = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.61300(ASP) | 1.681 | Plastic | 1.633 | 23.4 | −6.13 |
| 2 | | 1.80897(ASP) | 0.565 | | | | |
| 3 | Lens 2 | 5.25030(ASP) | 0.481 | Plastic | 1.544 | 55.9 | 4.42 |
| 4 | | −4.30090(ASP) | −0.080 | | | | |
| 5 | Aperture Stop | Plano | 1.016 | | | | |
| 6 | Lens 3 | 5.97140(ASP) | 1.442 | Plastic | 1.544 | 55.9 | 1.90 |
| 7 | | −1.14510(ASP) | 0.070 | | | | |
| 8 | Lens 4 | 6.26370(ASP) | 0.789 | Plastic | 1.633 | 23.4 | −2.33 |
| 9 | | 1.13536(ASP) | 0.700 | | | | |
| 10 | IR-filter | Plano | 0.300 | Glass | 1.517 | 64.2 | |
| 11 | | Plano | 0.489 | | | | |
| 12 | Image | Plano | | | | | |

Note:
reference wavelength is: d-line 587.6 nm.

TABLE 2

Aspheric Coefficients

| | Surface # | | | |
|---|---|---|---|---|
| | 1 | 2 | 3 | 4 |
| k = | −3.76838E+00 | 2.08872E−01 | −6.90403E+00 | −5.76824E+00 |
| A4 = | 1.51898E−02 | 7.93221E−02 | −1.75207E−02 | −8.01426E−02 |
| A6 = | 5.53584E−04 | 5.97215E−02 | −7.80536E−02 | −8.95492E−03 |
| A8 = | −1.12401E−04 | −5.46253E−02 | 1.13287E−01 | −5.72068E−02 |
| A10 = | 3.67082E−05 | 9.56046E−02 | −1.52277E−01 | −3.49583E−03 |
| A12 = | 6.97925E−07 | −2.95433E−03 | | |

| | Surface # | | | |
|---|---|---|---|---|
| | 6 | 7 | 8 | 9 |
| k = | −1.00000E+00 | −1.23459E+00 | 0.00000E+00 | −5.27192E+00 |
| A4 = | 8.50819E−03 | 9.38324E−02 | −1.28980E−01 | −7.34751E−02 |
| A6 = | −2.03305E−02 | −7.26449E−02 | 4.00835E−02 | 2.53783E−02 |
| A8 = | 7.17970E−03 | 3.58678E−02 | −1.71595E−02 | −7.76618E−03 |
| A10 = | −1.23253E−03 | −1.08802E−02 | 5.65423E−03 | 1.46486E−03 |
| A12 = | −1.60548E−04 | 1.50030E−03 | −7.01499E−04 | −1.30260E−04 |
| A14 = | 3.72855E−05 | | | 2.89973E−06 |

Figure 2A:
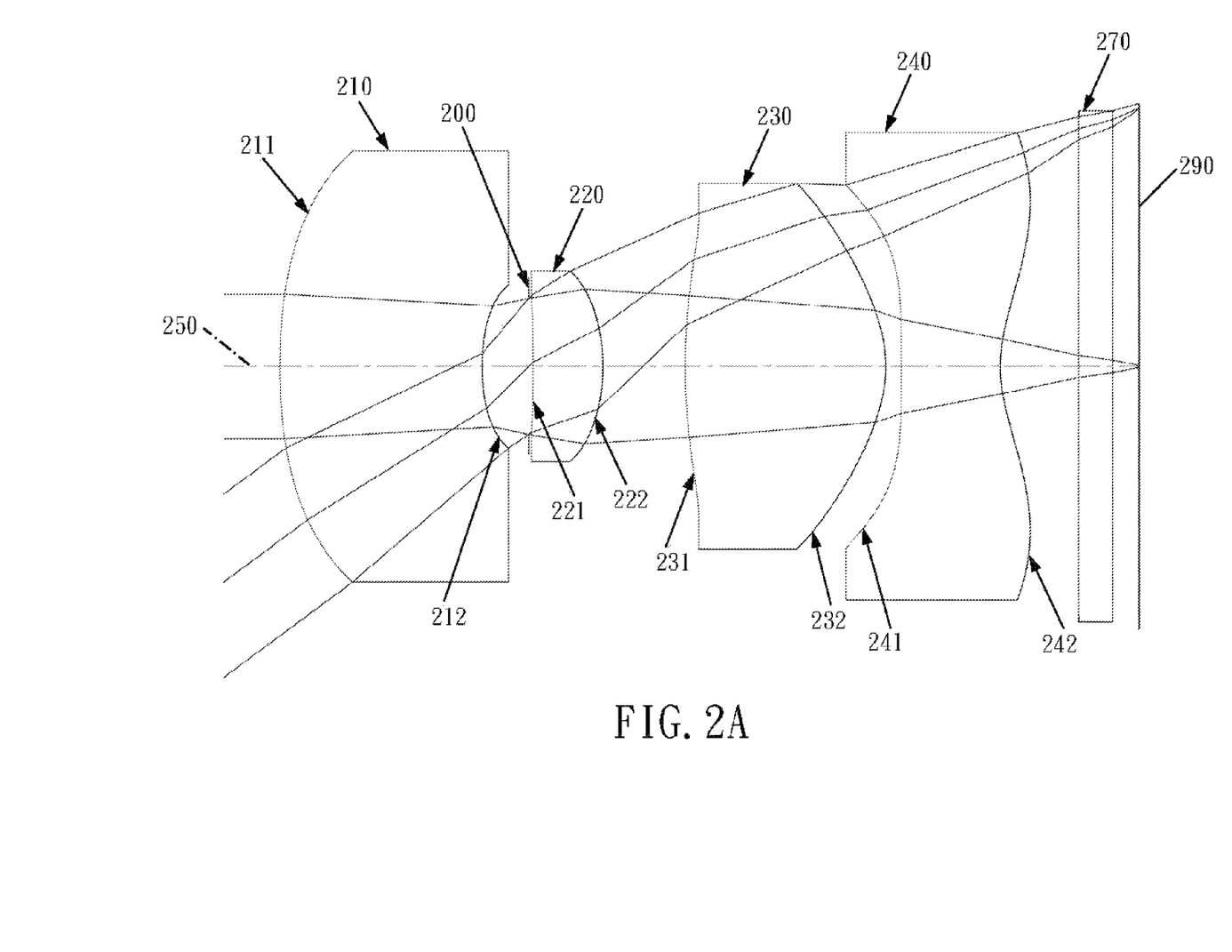
FIG. 2A shows an optical lens system in accordance with a second embodiment of the present invention.
Figure 2B:
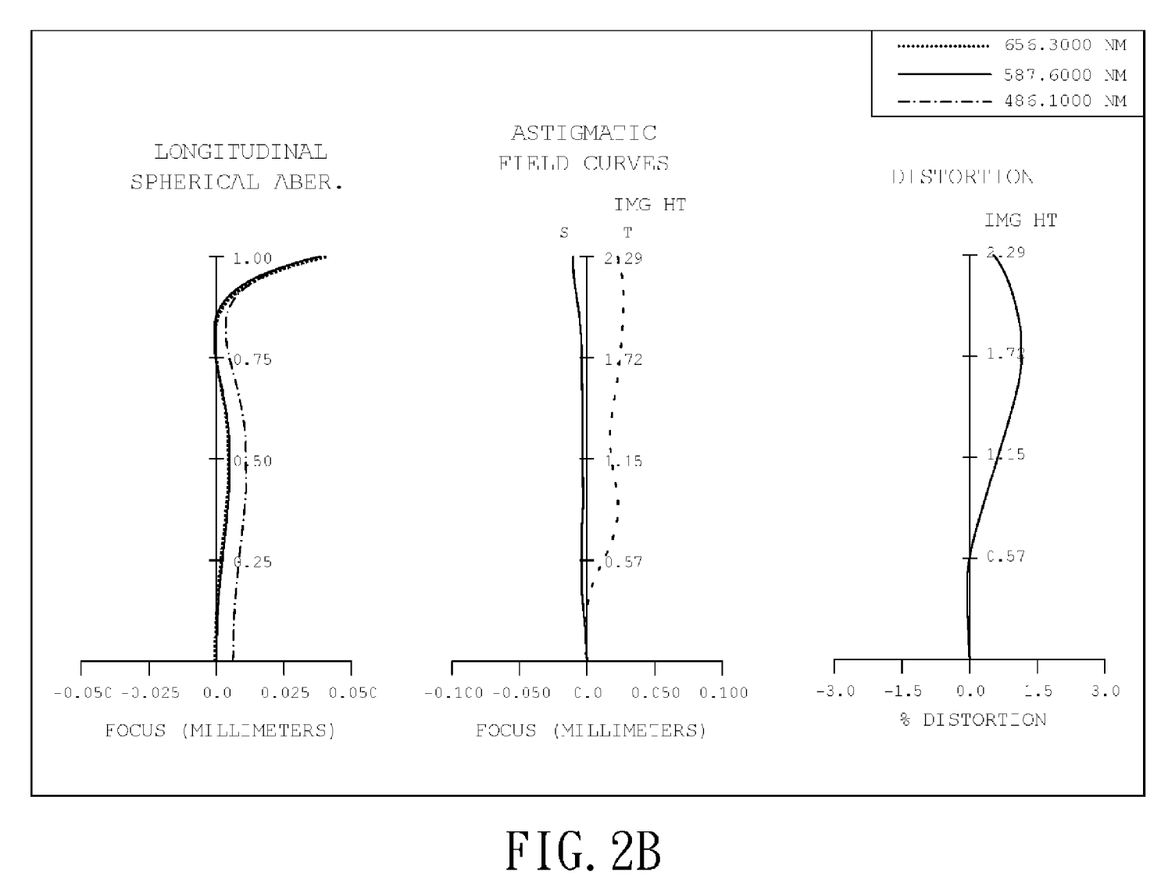
FIG. 2B shows the aberration curves of the second embodiment of the present invention.

Referring to FIG. 2A, which shows an optical lens system in accordance with the second embodiment of the present invention, and FIG. 2B shows the aberration curves of the second embodiment of the present invention. The second embodiment of the present invention comprises, in order from an object side to an image side:

A plastic first lens element 210 with negative refractive power has a convex object-side surface 211 and a concave image-side surface 212, and the object-side surface 211 and the image-side surface 212 of the first lens element 210 are aspheric.

A plastic second lens element 220 with positive refractive power has a concave object-side surface 221 and a convex image-side surface 222, and the object-side surface 221 and the image-side surface 222 of the second lens element 220 are aspheric.

A plastic third lens element 230 with positive refractive power has a convex object-side surface 231 and a convex image-side surface 232, and the object-side surface 231 and the image-side surface 232 of the third lens element 230 are aspheric.

A plastic fourth lens element 240 with negative refractive power has a concave object-side surface 241 and a concave image-side surface 242, the object-side surface 241 and the image-side surface 242 of the fourth lens element 240 are aspheric, and inflection points are formed on the object-side surface 241 and the image-side surface 242 of the fourth lens element 240.

An aperture stop 200 is located between the first lens element 210 and the second lens element 220.

An IR cut filter 270 made of glass is located between the image-side surface 242 of the fourth lens element 240 and an image plane 290, and it has no influence on the focal length of the optical lens system.

The equation for the aspheric surface profiles of the second embodiment has the same form as that of the first embodiment.

In the second embodiment of the present optical lens system, the focal length of the optical lens system is f, and it satisfies the relation:

$$f=3.11.$$

In the second embodiment of the present optical lens system, the f-number of the optical lens system is Fno, and it satisfies the relation:

$$Fno=2.40.$$

In the second embodiment of the present optical lens system, half of the maximal field of view is HFOV, and it satisfies the relation:

$$HFOV=36.5.$$

In the second embodiment of the present optical lens system, the Abbe number of the third lens element 230 is V3, the Abbe number of the fourth lens element 240 is V4, and they satisfy the relation:

$$V3-V4=32.5.$$

In the second embodiment of the present optical lens system, the distance on an optical axis between the first lens element 210 and the second lens element 220 is T12, the focal length of the optical lens system is f, and they satisfy the relation:

$$T12/f=0.15.$$

In the second embodiment of the present optical lens system, the center thickness of the first lens element 210 is CT1, the focal length of the optical lens system is f, and they satisfy the relation:

$$CT1/f=0.58.$$

In the second embodiment of the present optical lens system, the center thickness of the first lens element 210 is CT1, the center thickness of the second lens element 220 is CT2, and they satisfy the relation:

$$CT2/CT1=0.34.$$

In the second embodiment of the present optical lens system, the radius of curvature of the object-side surface 211 of the first lens element 210 is R1, the radius of curvature of the image-side surface 212 of the first lens element 210 is R2, and they satisfy the relation:

$$R1/R2=2.69.$$

In the second embodiment of the present optical lens system, the focal length of the second lens element 220 is f2, the focal length of the third lens element 230 is f3, and they satisfy the relation:

$f3/f2=0.57$.

In the second embodiment of the present optical lens system, the focal length of the first lens element 210 is f1, the focal length of the fourth lens element 240 is f4, and they satisfy the relation:

$f4/f1=0.33$.

In the second embodiment of the present optical lens system, the vertical distance from the furthest position of the light passing through the image-side surface 232 of the third lens element 230 to the optical axis 250 is Y32, the distance between the position Y32 from the optical axis on the image-side surface 232 of the third lens element 230 and a vertex on the image-side surface 232 of the third lens element 230 on the optical axis 250 is SAG32, and they satisfy the relation:

$SAG32/Y32=0.49$.

In the second embodiment of the present optical lens system, the distance from the aperture stop 200 to the image plane 290 along the optical axis 250 is SL, the distance from the object-side surface 211 of the first lens element 210 to the image plane 290 along the optical axis 250 is TTL, and they satisfy the relation:

$SL/TTL=0.71$.

In the second embodiment of the present optical lens system, the distance from the object-side surface 211 of the first lens element 210 to the image plane 290 along the optical axis 250 is TTL, an electronic imaging sensor (not shown) is provided on the image plane 290, half of a diagonal length of an effective pixel region of the electronic imaging sensor is ImgH, and they satisfy the relation:

$TTL/ImgH=3.29$.

The detailed optical data of the second embodiment is shown in table 3, and the aspheric surface data is shown in table 4, wherein the units of the radius of curvature, the thickness and the focal length are expressed in mm.

TABLE 3

(Embodiment 2)
f(focal length) = 3.11 mm, Fno = 2.40, HFOV (half of field of view) = 36.5 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Lens 1 | 5.01110(ASP) | 1.800 | Plastic | 1.634 | 23.8 | −6.03 |
| 2 |  | 1.86572(ASP) | 0.416 |  |  |  |  |
| 3 | Aperture Stop | Plano | 0.040 |  |  |  |  |
| 4 | Lens 2 | −12.70120(ASP) | 0.620 | Plastic | 1.544 | 55.9 | 3.65 |
| 5 |  | −1.74519(ASP) | 0.735 |  |  |  |  |
| 6 | Lens 3 | 6.09200(ASP) | 1.784 | Plastic | 1.544 | 55.9 | 2.07 |
| 7 |  | −1.24014(ASP) | 0.140 |  |  |  |  |
| 8 | Lens 4 | −3694.17090(ASP) | 0.880 | Plastic | 1.633 | 23.4 | −2.00 |
| 9 |  | 1.26839(ASP) | 0.700 |  |  |  |  |
| 10 | IR-filter | Plano | 0.300 | Glass | 1.517 | 64.2 |  |
| 11 |  | Plano | 0.237 |  |  |  |  |
| 12 | Image | Plano |  |  |  |  |  |

Note:
reference wavelength is: d-line 587.6 nm.

TABLE 4

Aspheric Coefficients

| | Surface # | | | |
|---|---|---|---|---|
| | 1 | 2 | 4 | 5 |
| k = | −2.01897E−01 | 4.61276E+00 | −2.00000E+02 | −1.59670E+00 |
| A4 = | 1.67912E−02 | 9.01319E−02 | −1.68088E−02 | −9.99461E−02 |
| A6 = | 1.97553E−04 | 1.57734E−02 | −6.46144E−02 | −8.88059E−02 |
| A8 = | −2.06226E−05 | −1.96185E−02 | 1.81826E−01 | 5.78090E−02 |
| A10 = | 7.01962E−05 | 1.98965E−01 | −2.92921E−01 | −1.04741E−01 |
| A12 = | −4.15320E−06 | −2.95459E−03 | | |

| | Surface # | | | |
|---|---|---|---|---|
| | 6 | 7 | 8 | 9 |
| k = | −1.00000E+00 | −1.30617E+00 | 0.00000E+00 | −5.88550E+00 |
| A4 = | 1.44048E−02 | 1.00462E−01 | −1.06455E−01 | −6.77336E−02 |
| A6 = | −1.53558E−02 | −7.28408E−02 | 2.98416E−02 | 2.40053E−02 |
| A8 = | 4.82026E−03 | 3.53262E−02 | −1.75754E−02 | −7.77911E−03 |
| A10 = | −1.88557E−03 | −1.01433E−02 | 5.70567E−03 | 1.47844E−03 |
| A12 = | 2.35414E−04 | 1.14122E−03 | −5.59810E−04 | −1.31093E−04 |
| A14 = | −1.41928E−04 | | | 3.58137E−06 |

Figure 3A:
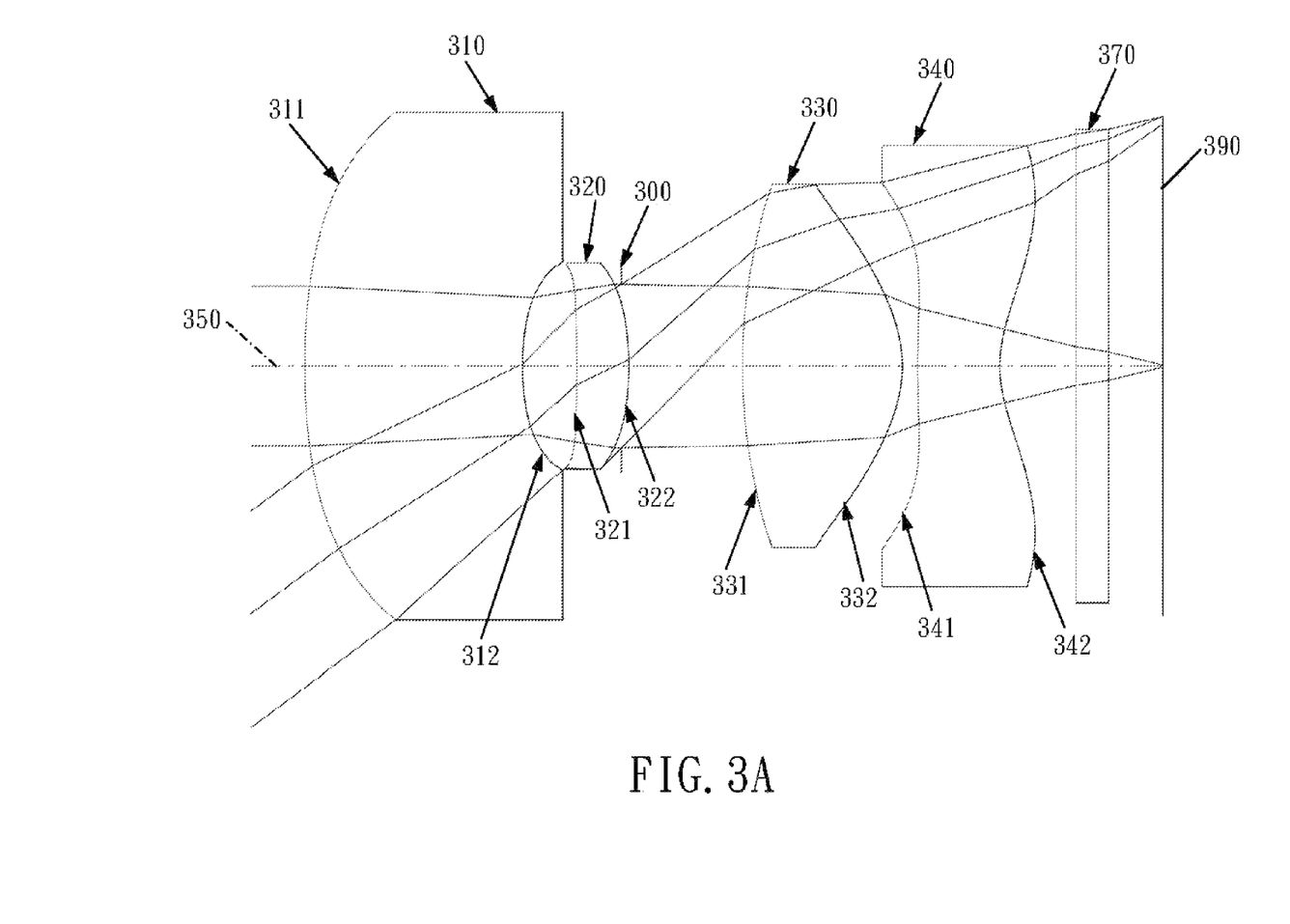
FIG. 3A shows an optical lens system in accordance with a third embodiment of the present invention.
Figure 3B:
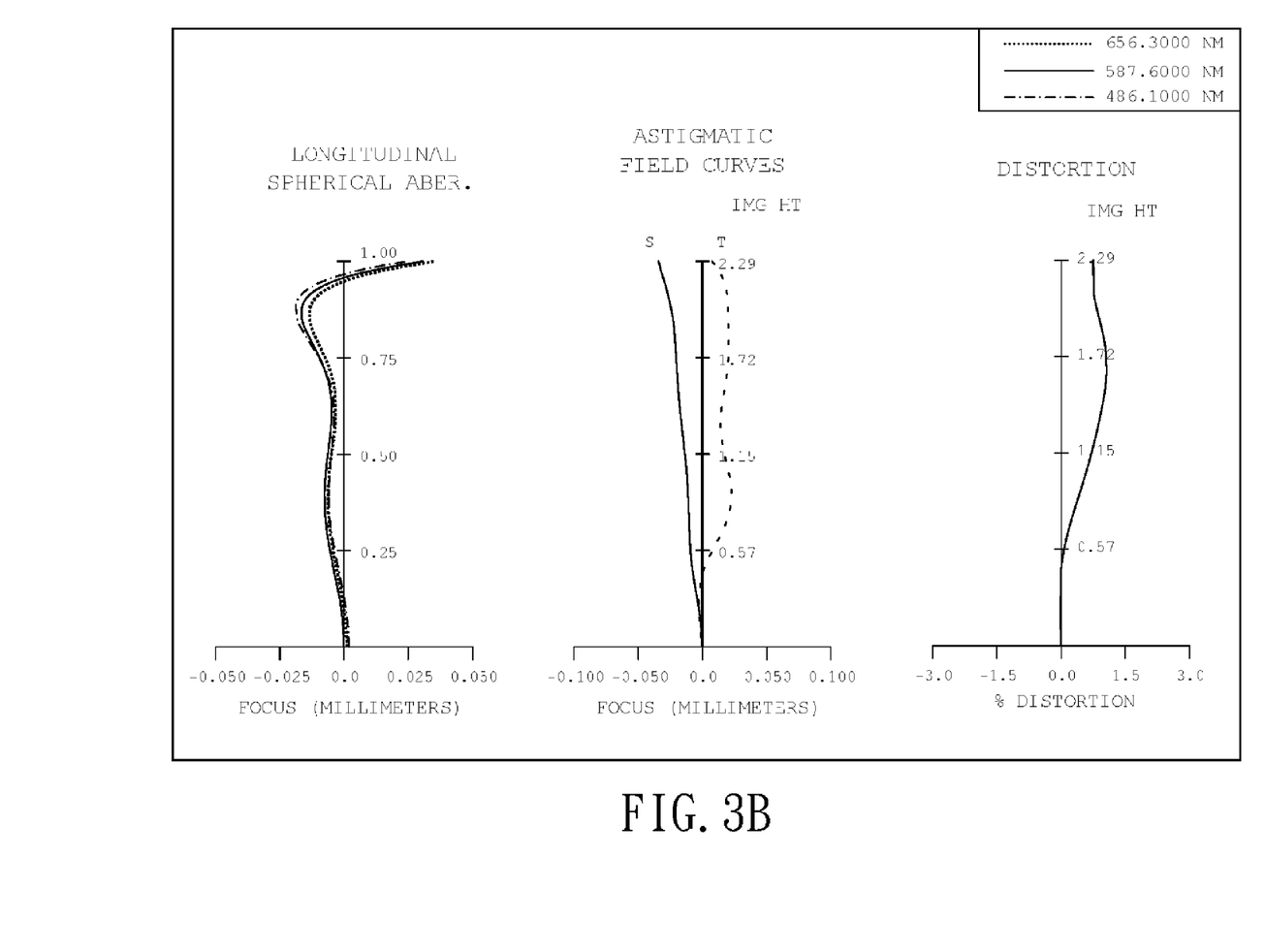
FIG. 3B shows the aberration curves of the third embodiment of the present invention.

Referring to FIG. 3A, which shows an optical lens system in accordance with the third embodiment of the present invention, and FIG. 3B shows the aberration curves of the third embodiment of the present invention. The third embodiment of the present invention comprises, in order from an object side to an image side:

A plastic first lens element 310 with negative refractive power has a convex object-side surface 311 and a concave image-side surface 312, and the object-side surface 311 and the image-side surface 312 of the first lens element 310 are aspheric.

A plastic second lens element 320 with positive refractive power has a concave object-side surface 321 and a convex image-side surface 322, and the object-side surface 321 and the image-side surface 322 of the second lens element 320 are aspheric.

A plastic third lens element 330 with positive refractive power has a convex object-side surface 331 and a convex image-side surface 332, and the object-side surface 331 and the image-side surface 332 of the third lens element 330 are aspheric.

A plastic fourth lens element 340 with negative refractive power has a convex object-side surface 341 and a concave image-side surface 342, the object-side surface 341 and the image-side surface 342 of the fourth lens element 340 are aspheric, and inflection points are formed on the object-side surface 341 and the image-side surface 342 of the fourth lens element 340.

An aperture stop 300 is located between the second lens element 320 and the third lens element 330.

An IR cut filter 370 made of glass is located between the image-side surface 342 of the fourth lens element 340 and an image plane 390, and it has no influence on the focal length of the optical lens system.

The equation for the aspheric surface profiles of the third embodiment has the same form as that of the first embodiment.

In the third embodiment of the present optical lens system, the focal length of the optical lens system is f, and it satisfies the relation:

$$f=3.09.$$

In the third embodiment of the present optical lens system, the f-number of the optical lens system is Fno, and it satisfies the relation:

$$Fno=2.10.$$

In the third embodiment of the present optical lens system, half of the maximal field of view is HFOV, and it satisfies the relation:

$$HFOV=36.5.$$

In the third embodiment of the present optical lens system, the Abbe number of the third lens element 330 is V3, the Abbe number of the fourth lens element 340 is V4, and they satisfy the relation:

$$V3-V4=32.5.$$

In the third embodiment of the present optical lens system, the distance on an optical axis between the first lens element 310 and the second lens element 320 is T12, the focal length of the optical lens system is f, and they satisfy the relation:

$$T12/f=0.16.$$

In the third embodiment of the present optical lens system, the center thickness of the first lens element 310 is CT1, the focal length of the optical lens system is f, and they satisfy the relation:

$$CT1/f=0.65.$$

In the third embodiment of the present optical lens system, the center thickness of the first lens element 310 is CT1, the center thickness of the second lens element 320 is CT2, and they satisfy the relation:

$$CT2/CT1=0.24.$$

In the third embodiment of the present optical lens system, the radius of curvature of the object-side surface 311 of the first lens element 310 is R1, the radius of curvature of the image-side surface 312 of the first lens element 310 is R2, and they satisfy the relation:

$$R1/R2=2.63.$$

In the third embodiment of the present optical lens system, the focal length of the second lens element 320 is f2, the focal length of the third lens element 330 is f3, and they satisfy the relation:

$$f3/f2=0.36.$$

In the third embodiment of the present optical lens system, the focal length of the first lens element 310 is f1, the focal length of the fourth lens element 340 is f4, and they satisfy the relation:

$$f4/f1=0.30.$$

In the third embodiment of the present optical lens system, the vertical distance from the furthest position of the light passing through the image-side surface 332 of the third lens element 330 to the optical axis 350 is Y32, the distance between the position Y32 from the optical axis 350 on the image-side surface 332 of the third lens element 330 and a vertex on the image-side surface 332 of the third lens element 330 on the optical axis 350 is SAG32, and they satisfy the relation:

$$SAG32/Y32=0.48.$$

In the third embodiment of the present optical lens system, the distance from the aperture stop 300 to the image plane 390 along the optical axis 350 is SL, the distance from the object-side surface 311 of the first lens element 310 to the image plane 390 along the optical axis 350 is TTL, and they satisfy the relation:

$$SL/TTL=0.63.$$

In the third embodiment of the present optical lens system, the distance from the object-side surface of the first lens element to the image plane 390 along the optical axis 350 is TTL, an electronic imaging sensor (not shown) is provided on the image plane 390, half of a diagonal length of an effective pixel region of the electronic imaging sensor is ImgH, and they satisfy the relation:

$$TTL/ImgH=3.39.$$

The detailed optical data of the third embodiment is shown in table 5, and the aspheric surface data is shown in table 6, wherein the units of the radius of curvature, the thickness and the focal length are expressed in mm.

TABLE 5

(Embodiment 3)
f(focal length) = 3.09 mm, Fno = 2.10, HFOV (half of field of view) = 36.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 6.50060(ASP) | 2.000 | Plastic | 1.634 | 23.8 | −7.81 |
| 2 | | 2.47425(ASP) | 0.489 | | | | |
| 3 | Lens 2 | −33.67000(ASP) | 0.482 | Plastic | 1.544 | 55.9 | 5.43 |
| 4 | | −2.73214(ASP) | −0.070 | | | | |
| 5 | Aperture Stop | Plano | 1.115 | | | | |
| 6 | Lens 3 | 5.50040(ASP) | 1.469 | Plastic | 1.544 | 55.9 | 1.97 |
| 7 | | −1.20316(ASP) | 0.140 | | | | |
| 8 | Lens 4 | 6.31300(ASP) | 0.756 | Plastic | 1.633 | 23.4 | −2.33 |
| 9 | | 1.14079(ASP) | 0.700 | | | | |
| 10 | IR-filter | Plano | 0.300 | Glass | 1.517 | 64.2 | |
| 11 | | Plano | 0.500 | | | | |
| 12 | Image | Plano | | | | | |

TABLE 6

Aspheric Coefficients

| | Surface # | | | |
|---|---|---|---|---|
| | 1 | 2 | 3 | 4 |
| k = | −5.53939E+00 | 1.47656E+00 | −1.29641E+02 | −2.98316E+00 |
| A4 = | 1.37327E−02 | 9.14610E−02 | −1.63317E−02 | −8.39426E−02 |
| A6 = | 4.71795E−05 | 5.02224E−02 | −7.43426E−02 | −3.01665E−03 |
| A8 = | −7.91231E−05 | −4.80674E−02 | 1.25266E−01 | −9.54436E−02 |
| A10 = | 3.68356E−05 | 1.14708E−01 | −1.84266E−01 | 3.99353E−02 |
| A12 = | −2.26837E−06 | −2.95469E−03 | | |

| | Surface # | | | |
|---|---|---|---|---|
| | 6 | 7 | 8 | 9 |
| k = | −1.00000E+00 | −1.30628E+00 | 0.00000E+00 | −4.74023E+00 |
| A4 = | 1.29292E−02 | 9.78797E−02 | −1.10014E−01 | −6.78327E−02 |
| A6 = | −1.18506E−02 | −7.41212E−02 | 3.19850E−02 | 2.32048E−02 |
| A8 = | 5.23052E−03 | 3.56386E−02 | −1.72820E−02 | −7.56544E−03 |
| A10 = | −1.55440E−03 | −9.87958E−03 | 5.65889E−03 | 1.48004E−03 |
| A12 = | 2.95220E−04 | 1.25012E−03 | −6.11120E−04 | −1.35790E−04 |
| A14 = | −9.65038E−06 | | | 3.94060E−06 |

TABLE 7

| | Embodiment 1 | Embodiment 2 | Embodiment 3 |
|---|---|---|---|
| f | 3.02 | 3.11 | 3.09 |
| Fno | 2.05 | 2.40 | 2.10 |
| HFOV | 37.4 | 36.5 | 36.5 |
| V3 − V4 | 32.5 | 32.5 | 32.5 |
| T12/f | 0.19 | 0.15 | 0.16 |
| CT1/f | 0.56 | 0.58 | 0.65 |
| CT2/CT1 | 0.29 | 0.34 | 0.24 |
| R1/R2 | 2.55 | 2.69 | 2.63 |
| f3/f2 | 0.43 | 0.57 | 0.36 |
| f4/f1 | 0.38 | 0.33 | 0.30 |
| SAG32/Y32 | 0.52 | 0.49 | 0.48 |
| SL/TTL | 0.64 | 0.71 | 0.63 |
| TTL/ImgH | 3.21 | 3.29 | 3.39 |

It is to be noted that the tables 1-6 show different data from the different embodiments, however, the data of the different embodiments is obtained from experiments. Therefore, any product of the same structure is deemed to be within the scope of the present invention even if it uses different data. Table 7 lists the relevant data for the various embodiments of the present invention While we have shown and described various embodiments in accordance with the present invention, it should be clear to those skilled in the art that further embodiments may be made without departing from the scope of the present invention.

What is claimed is:

1. An optical lens system comprising, in order from an object side to an image side:
   a first lens element with negative refractive power having a convex object-side surface and a concave image-side surface;
   a second lens element with positive refractive power;
   a third lens element with positive refractive power, both object-side and image-side surfaces of the third lens element being aspheric;
   a fourth lens element with negative refractive power having a concave image-side surface, both object-side and image-side surfaces of the fourth lens element being aspheric;
   wherein there are four lens elements with refractive power, a distance on an optical axis between the first lens element and the second lens element is T12, a focal length of the optical lens system is f, a center thickness of the first lens element is CT1; wherein the optical lens system is further provided with an aperture stop, a distance from the aperture stop to an image plane along the optical axis is SL, a distance from the object-side surface of the first lens element to the image plane along the optical axis is TTL, and they satisfy the relations:

$0.1 < T12/f < 0.3;$ $0.30 < CT1/f < 0.75;$ $0.52 < SL/TTL < 0.82.$

2. The optical lens system as claimed in claim 1, wherein the image-side surface of the third lens element is convex.

3. The optical lens system as claimed in claim 2, wherein at least one inflection point is formed on the fourth lens element.

4. The optical lens system as claimed in claim 3, wherein the third lens element and the fourth lens element are made of plastic material.

5. The optical lens system as claimed in claim 4, wherein a focal length of the second lens element is f2, a focal length of the third lens element is f3, and they satisfy the relation:

$0.2 < f3/f2 < 0.7.$

6. The optical lens system as claimed in claim 5, wherein an air distance exists between the first lens element and the second lens element, the center thickness of the first lens element is CT1, a center thickness of the second lens element is CT2, and they satisfy the relation:

$0.2 < CT2/CT1 < 0.50.$

7. The optical lens system as claimed in claim 5, wherein a focal length of the first lens element is f1, a focal length of the fourth lens element is f4, and they satisfy the relation:

$0.2 < f4/f1 < 0.45.$

8. The optical lens system as claimed in claim 7, wherein a vertical distance from the furthest position of the light passing through the image-side surface of the third lens element to the optical axis is Y32, a distance between a position Y32 from the optical axis on the image-side surface of the third lens element and a vertex on the image-side surface of the third lens element on the optical axis is SAG32, and they satisfy the relation:

$0.4 < SAG32/Y32 < 0.6.$

9. The optical lens system as claimed in claim 5, wherein an Abbe number of the third lens element is V3, an Abbe number of the fourth lens element is V4, and they satisfy the relation:

$30 < V3 - V4 < 42.$

10. The optical lens system as claimed in claim 5, wherein a radius of curvature of the object-side surface of the first lens element is R1, a radius of curvature of the image-side surface of the first lens element is R2, and they satisfy the relation:

$2.0 < R1/R2 < 3.0.$

11. The optical lens system as claimed in claim 2, wherein the distance from the object-side surface of the first lens element to the image plane along the optical axis is TTL; wherein an electronic imaging sensor is provided on the image plane, half of a diagonal length of an effective pixel region of the electronic imaging sensor is ImgH, and they satisfy the relation:

$TTL/ImgH < 3.8.$

12. An optical lens system comprising, in order from an object side to an image side:
a first lens element with negative refractive power having a convex object-side surface and a concave image-side surface;
a second lens element with positive refractive power;
a third lens element with positive refractive power;
a fourth lens element with negative refractive power having a concave image-side surface, at least one inflection point formed on the fourth lens element;
wherein there are four lens elements with refractive power, a focal length of the first lens element is f1, a focal length of the fourth lens element is f4, a center thickness of the first lens element is CT1 a center thickness of the second lens element is CT2; wherein the optical lens system is further provided with an aperture stop, a distance from the aperture stop to an image plane along an optical axis is SL, a distance from the object-side surface of the first lens element to the image plane along the optical axis is TTL, and they satisfy the relations:

$0.2 < f4/f1 < 0.6;$ $0.2 < CT2/CT1 < 0.5;$ $0.52 < SL/TTL < 0.82.$

13. The optical lens system as claimed in claim 12, wherein the third lens element is made of plastic material, and an object-side surface and an image-side surface of the third lens element are aspheric.

14. The optical lens system as claimed in claim 13, wherein a distance on the optical axis between the first lens element and the second lens element is T12, a focal length of the optical lens system is f, and they satisfy the relation:

$0.1 < T12/f < 0.3.$

15. The optical lens system as claimed in claim 14, wherein an Abbe number of the third lens element is V3, an Abbe number of the fourth lens element is V4, and they satisfy the relation:

$30 < V3 - V4 < 42.$

16. The optical lens system as claimed in claim 14, wherein a vertical distance from the furthest position of the light passing through the image-side surface of the third lens element to the optical axis is Y32, a distance between a position Y32 from the optical axis on the image-side surface of the third lens element and a vertex on the image-side surface of the third lens element on the optical axis is SAG32, and they satisfy the relation:

$0.4 < SAG32/Y32 < 0.6.$

17. The optical lens system as claimed in claim 13, wherein the object-side surface and the image-side surface of the third lens element are convex.

18. The optical lens system as claimed in claim 17, wherein a radius of curvature of the object-side surface of the first lens element is R1, a radius of curvature of the image-side surface of the first lens element is R2, and they satisfy the relation:

$2.0 < R1/R2 < 3.0.$

19. The optical lens system as claimed in claim 17, wherein a focal length of the second lens element is f2, a focal length of the third lens element is f3, and they satisfy the relation:

$0.2 < f3/f2 < 0.7.$

20. An optical lens system comprising, in order from an object side to an image side:
- a first lens element with negative refractive power having a convex object-side surface and a concave image-side surface;
- a second lens element with positive refractive power;
- a plastic third lens element with positive refractive power having a convex object-side surface and a convex image-side surface, both object-side and image-side surfaces of the third lens element being aspheric;
- a plastic fourth lens element with negative refractive power having a concave image-side surface, an object-side and the image-side surfaces of the fourth lens element being aspheric, at least one inflection point formed on the fourth lens element;
- wherein there are four lens elements with refractive power, a distance on an optical axis between the first lens element and the second lens element is T12, a focal length of the optical lens system is f, a focal length of the second lens element is f2, a focal length of the third lens element is f3; wherein the optical lens system is further provided with an aperture stop, a distance from the aperture stop to an image plane on the optical axis is SL, a distance from the object-side surface of the first lens element to the image plane along the optical axis is TTL, and they satisfy the relations:

$0.07 < T12/f < 0.50;$ $0.2 < f3/f2 < 0.7;$ $0.52 < SL/TTL < 0.82.$

21. The optical lens system as claimed in claim 20, wherein a focal length of the first lens element is f1, a focal length of the fourth lens element is f4, an Abbe number of the third lens element is V3, an Abbe number of the fourth lens element is V4, and they satisfy the relations:

$0.2 < f4/f1 < 0.6;$ $30 < V3 - V4 < 42.$

* * * * *